(12) United States Patent
Kherani

(10) Patent No.: US 8,549,284 B1
(45) Date of Patent: Oct. 1, 2013

(54) TUNABLE SCHEMES AND EVALUATION FOR CERTIFICATE VALIDITY CHECK IN VEHICLE-TO-ENTITY COMMUNICATIONS

(75) Inventor: Arzad A. Kherani, Mahasamund (IN)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 13/467,193

(22) Filed: May 9, 2012

(51) Int. Cl.
*H04L 29/06* (2006.01)
*H04N 7/167* (2011.01)

(52) U.S. Cl.
USPC ........... 713/158; 713/156; 713/173; 713/178; 726/2; 380/229; 380/232; 709/225; 709/226

(58) Field of Classification Search
None
See application file for complete search history.

(56) References Cited

U.S. PATENT DOCUMENTS

| | | | | |
|---|---|---|---|---|
| 2009/0132813 | A1* | 5/2009 | Schibuk | 713/158 |
| 2009/0260057 | A1* | 10/2009 | Laberteaux et al. | 726/2 |
| 2010/0067705 | A1* | 3/2010 | Boccon-Gibod et al. | 380/285 |
| 2013/0061055 | A1* | 3/2013 | Schibuk | 713/172 |

OTHER PUBLICATIONS

Lequerica et al.; Efficient Certificate Revocation in Vehicular Networks Using NGN Capabilities; 2010; pp. 1-5.*
Petit et al.; Analysis of Authentication Overhead in Vehicular Networks; 2010, pp. 1-6.*
Ganan et al.; RAR: Risk Aware Revocation mechanism for Vehicular Networks; 2012; pp. 1-6.*

* cited by examiner

*Primary Examiner* — Luu Pham
*Assistant Examiner* — Vu V Tran

(57) ABSTRACT

A method and system is provide for performing a certificate validity check between a vehicle receiving a message and an entity transmitting the message in a vehicle-to-entity communication system. The message includes a digital certificate. A determination is made whether the digital certificate is expired. A determination is made whether the digital certificate is listed in a local certificate revocation list stored in a memory of the vehicle in response to a determination that the digital certificate is not expired, otherwise, disregarding the message. An elapsed time is determined since a last freshness check in response the digital certificate not listed in the local certificate revocation list. The elapsed time is compared to a threshold requirement. The digital message is accepted for additional processing in response to the freshness check meeting the threshold requirement, otherwise, the message is disregarded.

12 Claims, 3 Drawing Sheets

TUNABLE SCHEMES AND EVALUATION FOR CERTIFICATE VALIDITY CHECK IN VEHICLE-TO-ENTITY COMMUNICATIONS

BACKGROUND OF INVENTION

An embodiment relates generally to vehicle-to-entity communications.

The use of certificate revocation lists (CRLs) for certificate validity checks in the internet has motivated the use of CRLs in other contexts such as vehicle-to-vehicle communications. Due to the intermittent connectivity with a certificate authority due to vehicles not being within a communication range of roadside equipment which provide accessibility to the certificate authority, a certificate at a verifier may not be up-to-date resulting in acceptance of messages signed using a revoked certificate.

SUMMARY OF INVENTION

An advantage of an embodiment is a determination of a validity check between a vehicle receiving a message and an entity transmitting a message in a V2X communication system where a probability used to determine whether to a accept a message a tunable based on a plurality of parameters including, but not limited to, last time since a freshness check was performed, geographical regions known for message transmission misbehavior, time of transmission, and a number of messages identified as misbehaved that are transmitted within a respective time duration.

An embodiment contemplates a method of performing a certificate validity check between a vehicle receiving a message and an entity transmitting the message in a vehicle-to-entity communication system. A message is received from an entity. The message includes a digital certificate. A determination is made whether the digital certificate is expired. A determination is made whether the digital certificate is listed in a local certificate revocation list stored in a memory of the vehicle in response to a determination that the digital certificate is not expired, otherwise, disregarding the message. An elapsed time is determined since a last freshness check in response the digital certificate not listed in the local certificate revocation list. The freshness check relates to the elapsed time since the freshness check was performed for verifying a validity of the digital certificate, otherwise the message is disregarded. The elapsed time is compared to a threshold requirement. The digital message is accepted for additional processing in response to the freshness check meeting the threshold requirement, otherwise, the message is disregarded.

An embodiment contemplates a certificate of revocation evaluation system that includes roadside equipment for communication with vehicles traveling within a broadcast region of the roadside equipment. The roadside equipment providing certification request list. The system further includes on-board equipment for communicating with the roadside equipment. The on-board equipment including a receiver for receiving a digital message from an entity that includes a digital certificate. The on-board equipment further including a processing unit for performing a certificate validity check between the vehicle receiving a message and the entity transmitting the message. The processing unit determines if the digital certificate is expired. The processing unit determines whether the digital certificate is listed in a local certificate revocation list stored in a memory of the vehicle in response to a determination that the digital certificate is not expired. The processing unit determines a time since a last successful freshness check in response to a determination that the digital certificate is not listed in the local certificate revocation list. The freshness check relates to the elapsed time since the freshness check was successfully performed for verifying a validity of the digital certificate. The processing unit compares the elapsed time to a threshold requirement. The digital message is accepted for additional processing in response to the freshness check meeting the threshold requirement.

DETAILED DESCRIPTION

Figure 1:
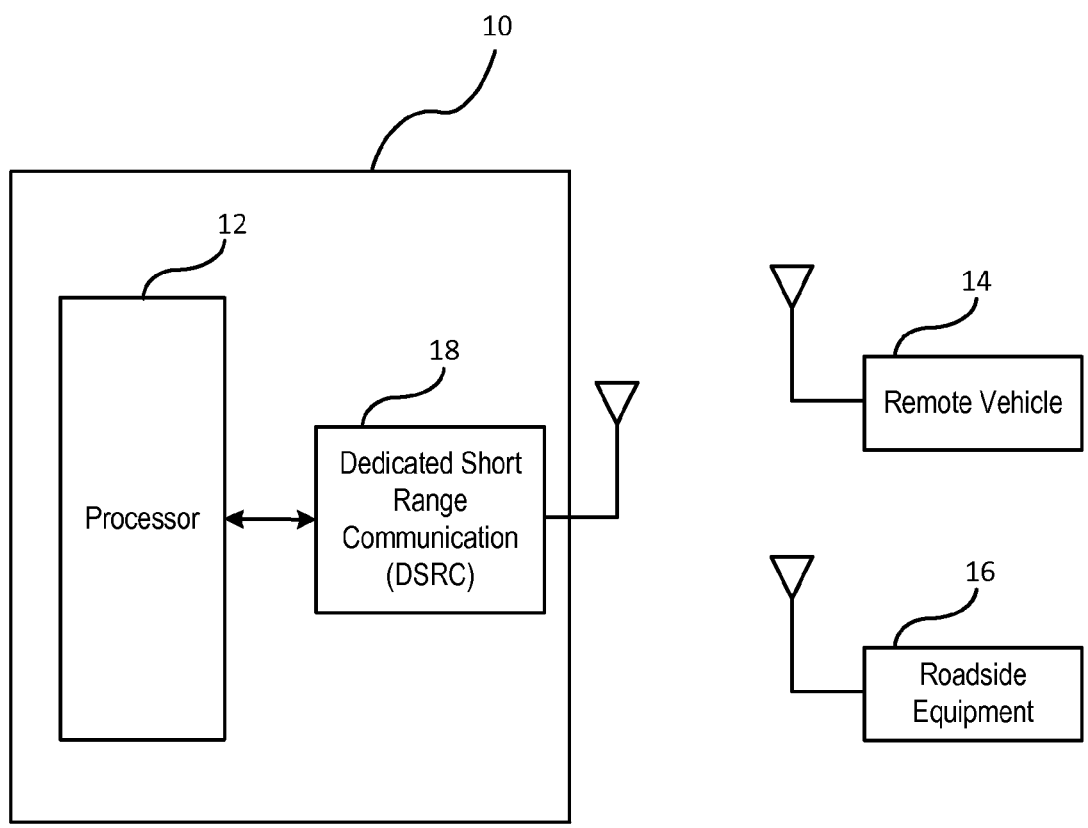
FIG. 1 is a block diagram of a vehicle-to-vehicle communication system.

There is shown in FIG. 1 a vehicle-to-vehicle communication system. A host vehicle 10 includes a processor 12 for processing incoming and outgoing messages between a host vehicle and remote entities. Remote entities may include, but is not limited to, remote vehicles 14 and roadside equipment 16. A dedicated short range communications radio (DSRC) 18 is provided for transmitting and receiving messages to and from remote entities that are within a broadcasting range of the host vehicle 10.

When the host vehicle 10 and the remote entities broadcast messages between one another, a public key infrastructure (PKI) is often used. PKI is an infrastructure that creates, manages, stores, distributes, and revokes digital certificates. Digital certificates are used to establish a broadcast entity's credentials for broadcast authentication. The digital certificates are issued by a certificate authority (CA). The CA controls the distribution and revocation of digital certificates. The digital certificate may contain a name, a serial number, expiration dates, and a copy of the digital certificate holder's public key which is used for encrypting messages and digital signatures. The digital signature provided with the digital certificate allows a recipient of the message to verify that the digital certificate is authentic. A registration authority (RA) or third party entity functions as a verifier for the CA for verifying a requesting entity's request for a digital certificate and instructs the CA to issue the digital certificate. That is, the CA will request verification from the RA. If the RA verifies the information provided by the requesting entity (i.e., of the digital certificate), then the CA will go forward in issuing a digital certificate.

Certificate revocation lists (CRL) are utilized in the operation of PKIs. A CRL is a list of digital certificates that have been revoked or are no longer valid, and therefore, the host vehicle receiving a message from a remote entity for which the digital certificate has been revoked or is no longer valid should not be relied on and the message should be disregarded. A digital certificate may be revoked for several reasons including, but not limited to, the CA authority improperly issuing the certificate, misbehavior by the certificate holder including violations of policies specified by the CA, or if the private-key is thought to be compromised (i.e., known by any entity other than the entity the key was issued to).

The CRL is regenerated and republished on a periodic basis or may be done so after a digital certificate has been revoked. The digital certificate may also have expiration dates which may be examined for determining a validity of the digital certificate. As a result, a digital certificate status should be checked whenever a requesting entity wants to rely on a digital certificate, otherwise, a revoked digital certificate may be wrongly accepted as relied on. Therefore, it is pertinent to have a latest listing of the CRL. The issue in vehicle communications is that vehicles are not in constant communication with roadside entities or other communication devices (i.e., due to broadcast range) and therefore may not readily have an up to date CRL. As a result, the validity approaches that will be discussed below provide additional verification schemes that may be used for determining a validity of a certificate from a remote entity that are in addition to the already known verification schemes using CRLs and the digital certificate expirations dates.

Figure 2:
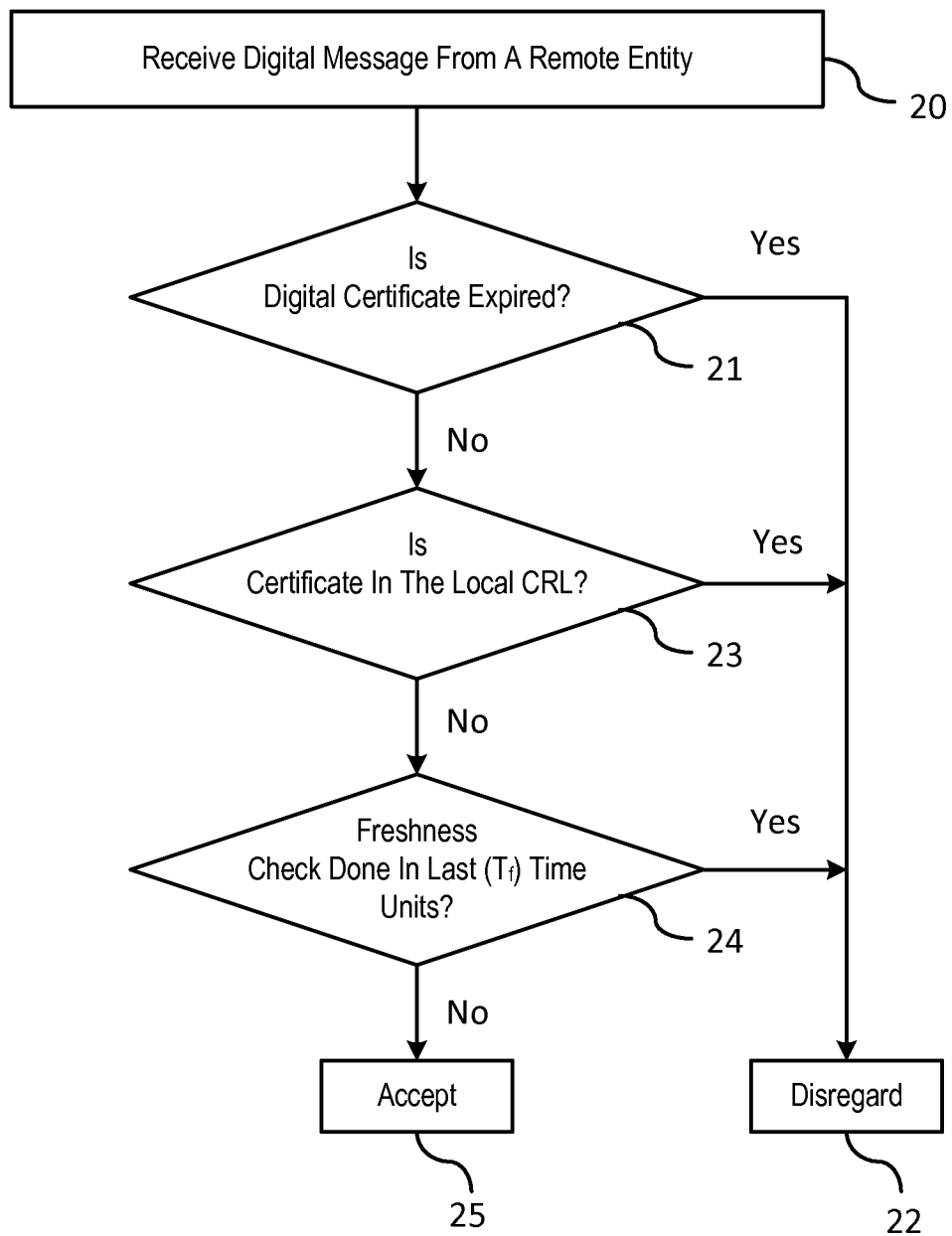
FIG. 2 is a flowchart of a method for a threshold-type technique for disregarding the message

FIG. 2 illustrates a process flow for threshold-type accept/disregard technique at a receiver of a host vehicle. In step 20, a message having a digital certificate is received from a remote entity. The digital certificate will have a digital signature and a certificate expiration date set forth in the digital certificate.

In step 21 a determination is made whether the digital certificate is expired. If the determination is made that the digital certificate is expired based on the date set forth in the digital certificate, then the message is disregarded in step 22. If the determination is made that the digital certificate has not expired, the routine proceeds to step 23.

In step 23, a determination is made whether the digital certificate associated with the received message is listed in the CRL stored in the memory of the host vehicle. The CRL preferably should be a local listing that is associated with the broadcast region of travel. If the determination is made that the digital certificate is on the CRL, then the routine proceeds to step 22 where message is disregarded. If the determination is made that the digital certificate is not listed on the CRL, then the routine proceeds to step 24.

In step 24, a determination is made whether the last freshness check requested by the remote entity for the digital certificate is within a freshness check threshold. That is, the freshness check relates to a time stamp when the remote entity requested an updated digital certificate. When a remote entity requests a freshness check and if the remote entity's digital certificate has not been revoked, the CA will respond with a new digital certificate. Within the new digital certificate, information is provided indicating the time instant at which a successful freshness check was conducted. This may be performed utilizing a field, designated by $C_f$, in the digital certificate that indicates this timestamp. This field initially has the time of issue of the digital certificate and is updated during subsequent freshness checks. The duration of time since the freshness check $C_f$ is compared to a freshness check threshold $T_f$. The freshness check threshold $T_f$ may be a predetermined parameter or may be a dynamic parameter. For example, if the vehicle is in an area where numerous digital certificates have been recently revoked for misbehavior, then the freshness check threshold $T_f$ may set to a short duration of time indicating a short benefit of doubt as to the validity of the certificate. In such an instance, the host vehicle may be conservative by only wanting to accept messages from those entities that have been successfully updated by the CA. In step 24, If the determination is made that the duration of time since the last freshness check $C_f$ is greater than the freshness check threshold $T_f$, then the routine proceeds to step 22 where the message is disregarded. If the determination is made that the duration of time since the last freshness check $C_f$ is less than the freshness check threshold $T_f$, then the routine proceeds to step 25 where the message is accepted. The returns to step 20 for determining a validation of a next message.

Figure 3:
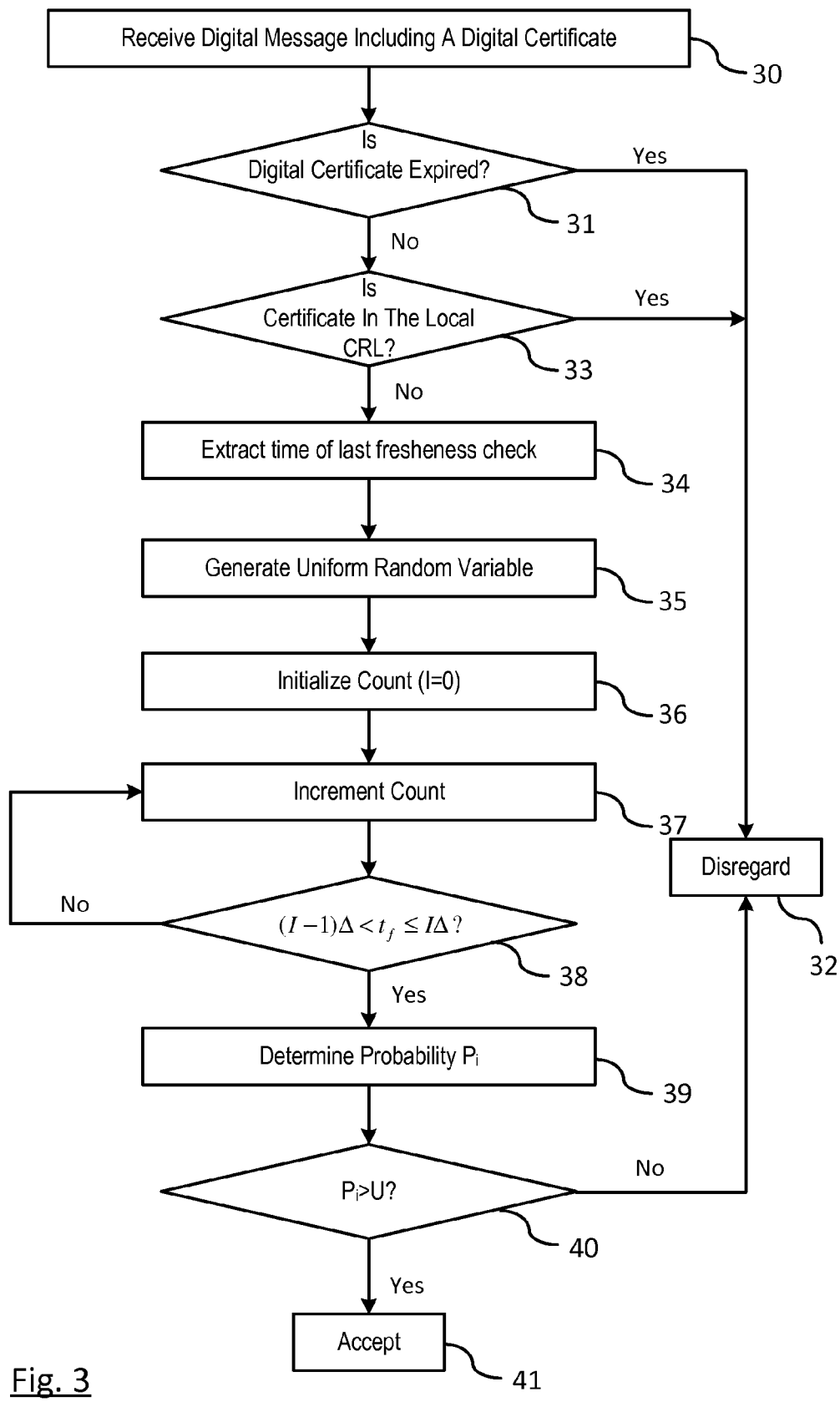
FIG. 3 is a flowchart of a method for a probability-type technique for disregarding the message.

FIG. 3 illustrates a process flow for probablistic-type accept/disregard technique at a receiver of a host vehicle. In step 30, a message having a digital certificate is received from a remote entity. The digital certificate will have a digital signature and a certificate expiration date set forth in the digital certificate.

In step 31 a determination is made whether the digital certificate is expired. If the determination is made that the digital certificate is expired based on the date set forth in the digital certificate, then the message is disregarded in step 32. If the determination is made that the digital certificate has not expired, the routine proceeds to step 33.

In step 33, a determination is made whether the digital certificate associated with the received message is listed in the CRL stored in the memory of the host vehicle. The CRL preferably should be a local listing that is associated with the broadcast region of travel. If the determination is made that the digital certificate is on the CRL, then the routine proceeds to step 32 where message is disregarded. If the determination is made that the digital certificate is not listed on the CRL, then the routine proceeds to step 34.

In step 34, an elapsed time $t_f$ since the last freshness check is extracted from the message. This information is stored for further processing.

In step 35, a uniform random variable U is generated. The random variable is a comparator to a probability for determining whether to accept or disregard the message.

In step 36, a counter I is initialized and set to 0. In step 37, the counter is incremented by a time delta. The time delta is preferably an integer. For example, the time delta may be 1 which represents 1 hour.

In step 38, a determination is made whether the time delta satisfies the following equation:

$$(I-1)\Delta < t_f \leq I\Delta$$

where $t_f$ is the elapsed time since the last freshness check, and I is the count value. If the equation is not satisfied by the current count value, then a return is made to step 37 where the count value is incremented by the time delta. The routine returns to step 38 to determine if the equation is satisfied. The routine will continue to loop between steps 37 and step 38 until the equation in step 38 is satisfied. If the determination is made in step 38 that the count value satisfies the equation, then the routine proceeds to step 39.

In step 39, a probability 1 is determined setting forth the threshold as to whether the receiver accepts a message from a sender. The probability is determined as a function of the elapsed time of the freshness check. In addition, the probability may further be determined as a function of the area of travel (i.e., whether it is known for misbehavior communications) and/or time of day (i.e., a time of day when communications are known or expected to occur).

In step 40, a determination is made whether the determined probability $P_i$ is greater than the uniform random variable U. If the determined probability $P_i$ is less than the uniform random variable U, then the routine proceeds to step 33 where the message is disregarded. If the determined probability $P_i$ is greater than the uniform random variable U, the message proceeds to step 41 where the message is accepted.

While certain embodiments of the present invention have been described in detail, those familiar with the art to which this invention relates will recognize various alternative designs and embodiments for practicing the invention as defined by the following claims.

What is claimed is:

1. A method of performing a certificate validity check between a vehicle receiving a message and an entity transmitting the message in a vehicle-to-entity communication system, the method comprising the steps of:

receiving, by the vehicle, the message transmitted from an the entity, the message having a digital certificate;

determining, by a processing unit of the vehicle, whether the digital certificate is expired;

determining, by the processing unit of the vehicle, whether the digital certificate is not listed in a local certificate revocation list stored in a memory of the vehicle in response to a determination that the digital certificate is not expired, otherwise, disregarding the message;

determining, by the processing unit of the vehicle, an elapsed time since a last freshness check in response to the digital certificate not listed in the local certificate revocation list, the freshness check relating to the elapsed time since the freshness check was performed for verifying a validity of the digital certificate;

comparing, by the processing unit of the vehicle, the elapsed time to a threshold requirement, the threshold requirement being based on a probabilistic technique, wherein the message is accepted for additional processing in response to the freshness check meeting the threshold requirement, otherwise, disregarding the message;

wherein the probabilistic technique further comprises the steps of:

determining a probability threshold that is a based on the elapsed time of the freshness check, the elapsed time since a last freshness check is verified by the following formula:

$$(I-1)\Delta < t_f \leq I\Delta$$

where I is a count value, $t_f$ is the elapsed time since a last freshness check, and $\Delta$ is an interval constraint;

generating a uniform random variable; and comparing the probability threshold with the uniform random variable for determining whether to accept the digital message.

2. The method of claim 1 wherein the probability threshold is further based on a number of messages identified as misbehaved communications received within a time frame of a current time period.

3. The method of claim 1 wherein the probability threshold is further based on a geographical region known for misbehaved communications.

4. The method of claim 1 wherein the probability threshold is set based on a time of day.

5. A certificate revocation evaluation system comprising:

a roadside equipment for communicating with vehicles traveling within a broadcast region of the roadside equipment, the roadside equipment providing a certification revocation list;

an on-board equipment for communicating with the roadside equipment, the on-board equipment including a receiver for receiving a digital message that includes a digital certificate from a transmitting entity, the on-board equipment further including a processing unit for performing a certificate validity check when the vehicle receives the digital message from the transmitting entity;

wherein the processing unit is further configured to:

determine whether the digital certificate is expired;

determine whether the digital certificate is not listed in a local certificate revocation list stored in a memory of the vehicle in response to a determination that the digital certificate is not expired, otherwise, disregarding the message;

determine an elapsed time since a last freshness check in response to the digital certificate not listed in the local certificate revocation list, the freshness check relating to the elapsed time since the freshness check was performed for verifying a validity of the digital certificate, the elapsed time since a last freshness check was performed is verified by the following formula:

$$(I-1)\Delta < t_f \leq I\Delta$$

where I is a count value, $t_f$ is the elapsed time since a last freshness check, and $\Delta$ is an interval constraint; and compare the elapsed time to a threshold requirement, wherein the digital message is accepted for additional processing in response to the freshness check meeting the threshold requirement, otherwise, disregarding the message.

6. The system of claim 5 wherein the processing unit determines that the digital certificate is to be discarded in response to the determination that the digital certificate is expired.

7. The system of claim 5 wherein the processing unit determines that the digital certificate is to be discarded in response to the determination that the digital certificate is listed on the certificate revocation list.

8. The system of claim 5 wherein the processing unit determines that the digital certificate is to be discarded in response to the determination that the freshness check does not satisfy the threshold requirement.

9. The system of claim 5 wherein the processing unit determines the threshold requirement as a function of a probabilistic technique, wherein the processing unit determines a probability threshold that is a based on an elapsed time of the freshness check, wherein the processing unit generates a uniform random variable, and wherein the processing unit compares the probability threshold to the uniform random variable determining whether to accept the digital message.

10. The system of claim 5 wherein the probability threshold is further based on a number of messages identified as misbehaved communications received within a time frame of a current time period.

11. The system of claim 5 wherein the probability threshold is further based on a geographical region known for misbehaved communications.

12. The system of claim 5 wherein the probability threshold is set based on a time of day.

* * * * *